(12) United States Patent
Dang et al.

(10) Patent No.: US 7,268,951 B2
(45) Date of Patent: Sep. 11, 2007

(54) OPTICAL BEAM SPLITTER

(75) Inventors: Lieu-Kim Dang, Schaan (DE); Reinhard Waibel, Berneck (CH)

(73) Assignee: Hilti Aktiengesellschaft, Schaan (LI)

( * ) Notice: Subject to any disclaimer, the term of this patent is extended or adjusted under 35 U.S.C. 154(b) by 71 days.

(21) Appl. No.: 10/935,661

(22) Filed: Sep. 7, 2004

(65) Prior Publication Data
US 2005/0068626 A1    Mar. 31, 2005

(30) Foreign Application Priority Data
Sep. 25, 2003 (DE) ................. 103 44 472

(51) Int. Cl.
G02B 27/14 (2006.01)
G02B 3/06 (2006.01)
G02B 17/00 (2006.01)
G02B 27/10 (2006.01)

(52) U.S. Cl. .............. 359/629; 359/618; 359/710; 359/726

(58) Field of Classification Search ............. 359/618, 359/629, 639, 640, 708, 709, 710, 712, 833, 359/834, 835, 836, 583, 631, 633, 850, 719, 359/722, 725, 726; 33/283
See application file for complete search history.

(56) References Cited

U.S. PATENT DOCUMENTS

| | | | | |
|---|---|---|---|---|
| 1,838,971 A | * | 12/1931 | Whitaker et al. | 359/834 |
| 4,411,489 A | * | 10/1983 | McGrew | 359/9 |
| 5,777,695 A | * | 7/1998 | Yamagishi | 348/744 |
| 6,327,090 B1 | * | 12/2001 | Rando et al. | 359/618 |
| 6,657,788 B2 | * | 12/2003 | Tacklind et al. | 359/618 |
| 6,856,470 B2 | * | 2/2005 | Nishimura | 359/710 |

* cited by examiner

Primary Examiner—Audrey Y. Chang
(74) Attorney, Agent, or Firm—Abelman, Frayne & Schwab

(57) ABSTRACT

An optical beam splitter (1) for a light beam (2) that is parallel along a beam axis (A) has a transparent central area (3) and a plurality of reflecting reflector surfaces (4a, 4b) that are respectively inclined by a reflector angle ($\alpha$) relative to the beam axis (A) for generating each a discrete spot beam (5a, 5b), with the central area (3) being convexly curved in the manner of a prism at least in part and/or has beam-expanding diffractive optics (19).

3 Claims, 3 Drawing Sheets

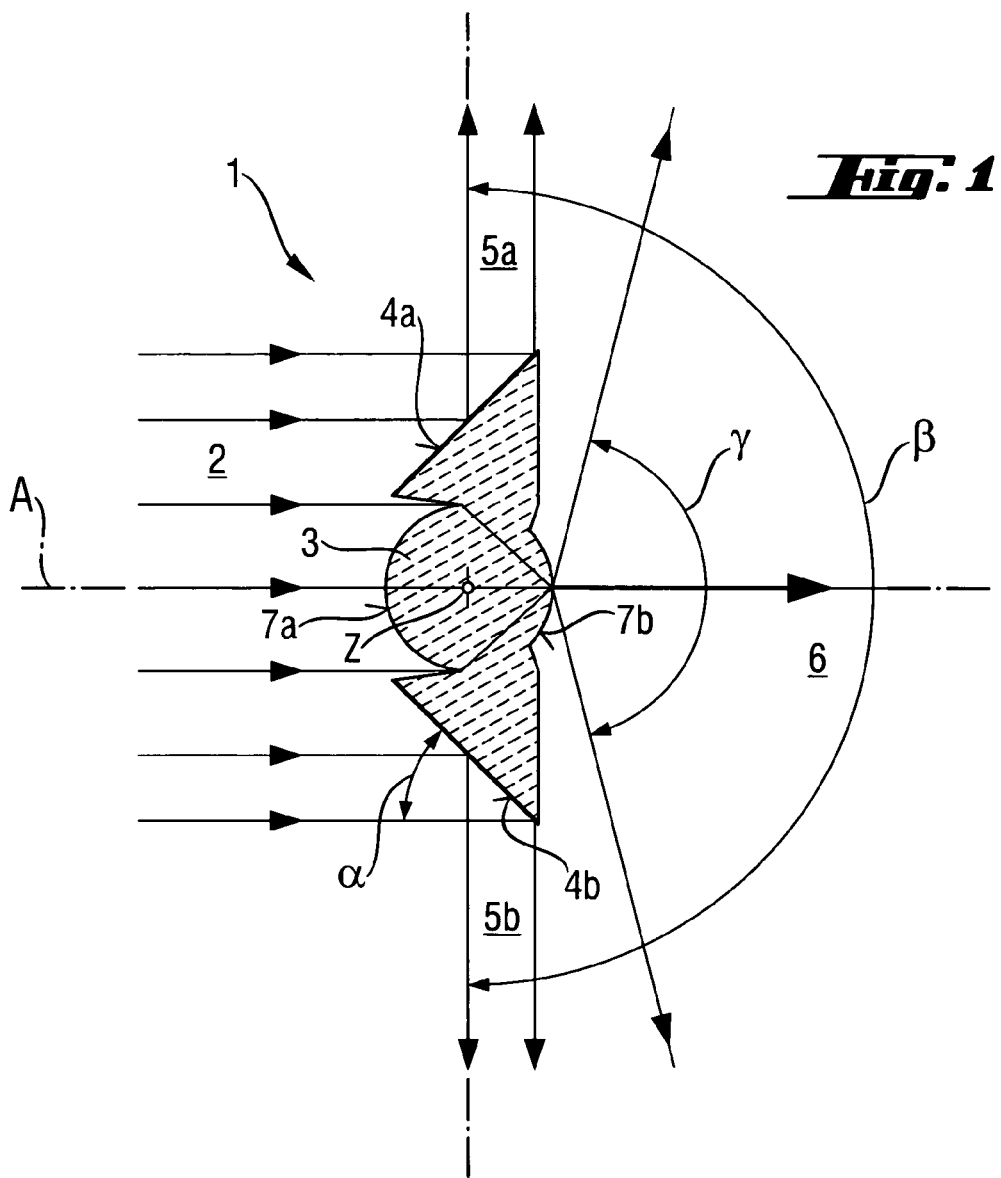
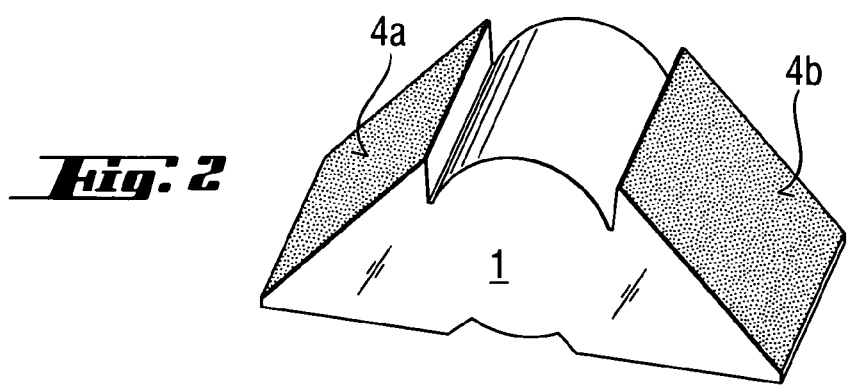

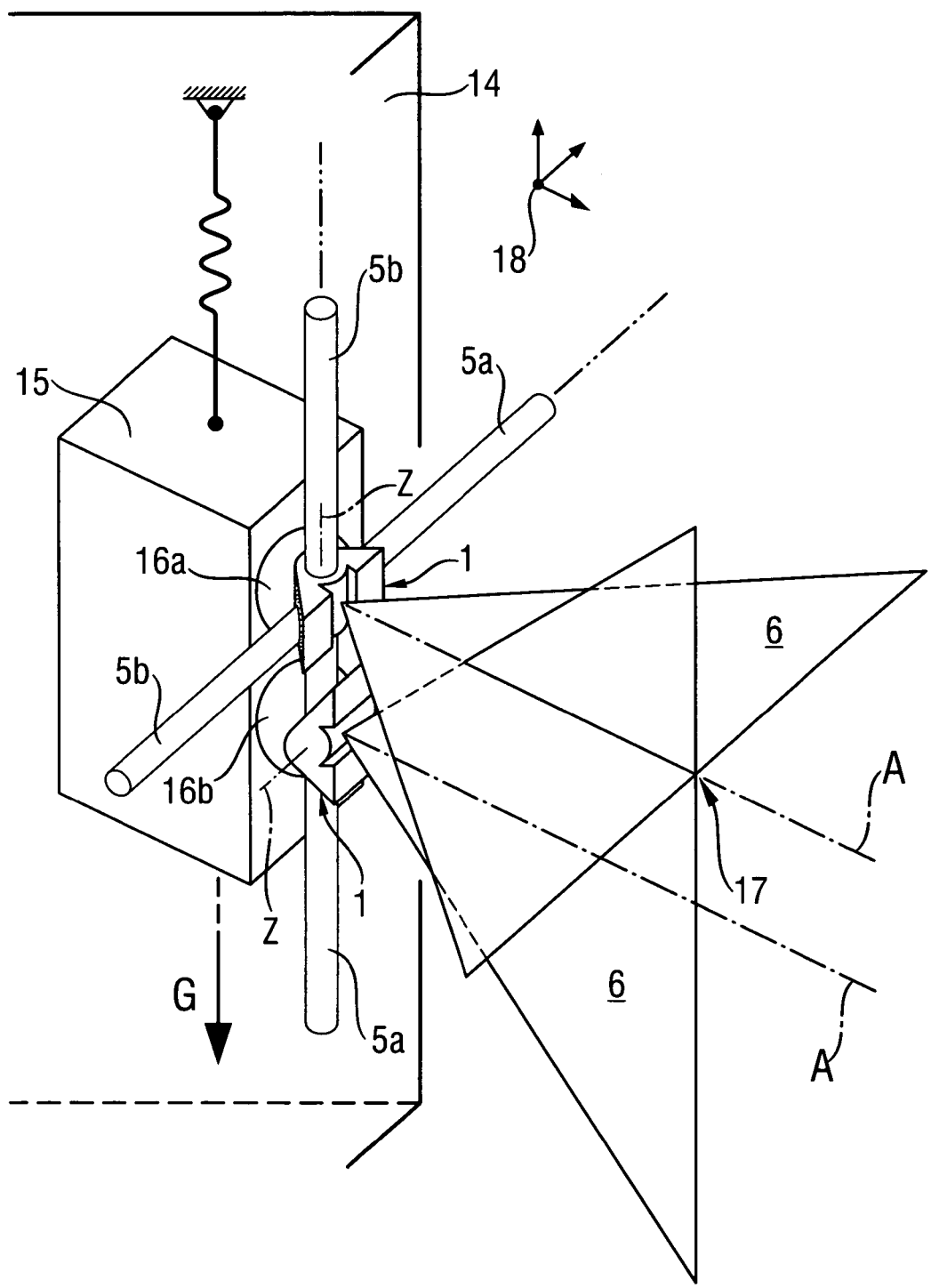

OPTICAL BEAM SPLITTER

BACKGROUND OF THE INVENTION

1. Field of the Invention

The invention is directed to a beam splitter, preferably for optical positioning instruments such as multiaxis construction lasers or rotating construction lasers.

2. Description of Prior Art

In marking the alignment of tools and in marking of workpieces, particularly in the construction industry, there is a need for precisely defined, highly visible and sufficiently bright light marks which form a defined reference angle, for example, in a leveled Cartesian coordinate system of a multiaxis construction laser.

Beam splitters are optical components whose optically reflecting surfaces are formed at least partially planar and, therefore, discretely deflect a focused light beam or discretely divide parallel light beams.

In contrast, cylindrical lenses are optical components the optical refraction surfaces of which are formed at least partially as a cylindrical jacket and, therefore, continuously deflect a focused light beam within a plane or continuously expand a light beam. Because of the cylindrical shape, the intensity for transmitted, parallel-polarized light near the edge and, therefore, of the deflected line beam decreases steeply as the expansion angle increases. A deflecting angle of 90° cannot be achieved in practice. In addition, diffraction effects prevent a sharply defined limitation of the deflection angle.

According to U.S. Pat. No. 5,363,469, a prismatic lens has a cylindrical central area and two concave lateral areas which limit the expansion angle in a defined manner by total internal reflection of edge portions of the light beam without splitting the light beam into discrete partial beams.

According to U.S. Pat. No. 543,730, an optical beam splitter for a light beam that is parallel along a beam axis has a plane-parallel transparent central area and a plurality of reflecting reflector surfaces that are inclined by 45° to the beam axis so that spot beams can be generated perpendicular to one another.

Further, according to U.S. Pat. No. 6,005,719, the parallel light beam in a multiaxis construction laser is discretely deflected with beam splitter gratings within two planes perpendicular to one another so that two rows of discretely divided spot beams are formed. It is also disclosed that the use of a cylindrical lens for continuous expansion of a focused light beam within a plane is disadvantageous.

Further, according to U.S. Pat. No. 5,838,431, the parallel light beam in a rotating construction laser is continuously expanded within a plane as a linear beam with a greater brightness along the axis by a prismatic combination lens with a plane-parallel transparent area and a cylindrical segment-shaped area smoothly adjoining the latter. A discrete splitting of the light beam into spot beams that are deflected in a predetermined manner is not possible.

It is an object of the invention to provide an optical beam splitter for generating a plurality of discrete spot beams with a defined reference angle and a linear beam which is continuously expanded in a plane.

SUMMARY OF THE INVENTION

This and other objects of the present invention, which will become apparent hereinafter, are archieved by providing an optical beam splitter for a light beam parallel along a beam axis and which has a transparent central area and a plurality of reflecting reflector surfaces that are, respectively, inclined by a reflection angle relative to the beam axis for generating a discrete spot beam in each instance, with the central area being convexly curved in the manner of a prism at least in part and/or has beam-expanding diffractive optics.

With the prismatic convexly curved shape of the central area, which acts at least infinitesimally as a cylindrical lens, the partial beam that is parallel to the axis is continuously expanded as a linear beam in the plane of the cylinder axis and a discrete spot beam is formed in each instance with two additional partial beam by the reflector surfaces, with the spot beams forming a defined reference angle relative to one another.

The central area advantageously has a cylindrical segment shape with a cylindrical axis that is oriented perpendicular to the beam axis and to at least two spot beams so that the linear beam lies within a plane spanned by the spot beams.

The cylindrical segment-shaped central area advantageously forms cylindrical segments on the beam input side and on the beam output side, so that a high angular deflection is carried out.

The segment angle of the cylindrical segment on the beam input side is advantageously greater than the segment angle of the cylindrical segment on the beam output side, so that a spatial optimization is effected with respect to the effective beam path within the central area.

The diffractive optics is advantageously formed as a cylindrical lens array, e.g., in the form of a Fresnel lens, or as an optically active microstructure, e.g., in the form of a hologram or phase grating, so that the overall length of the optical beam splitter can be reduced along the beam axis.

The reflection angle is advantageously exactly 45° to the beam axis so that the spot beams are oriented perpendicular to the beam axis.

The individual reflector surfaces are advantageously offset relative to one another around the beam axis by a multiple of 90° so that the spot beams form a reference angle of 90°, 180° or 270° relative to one another.

In an advantageous manner, there are provided exactly two diametrically opposite reflector surfaces so that the two oppositely oriented spot beams define a half-plane. A beam splitter of this kind can advantageously be used in a rotating construction laser which, in conjunction with a determinable beam axis, spans a Cartesian coordinate system.

The beam splitter is advantageously constructed physically in one piece and further advantageously comprises prismatic injection-molded optics of transparent plastic such as polystyrene with silvered reflector surfaces so that this beam splitter can be manufactured in large numbers in a simple manner.

Alternatively, the beam splitter is advantageously assembled in a modular manner from a transparent solid cylinder, at least one prism with silvered reflector surfaces, and optional additional parts so that standard optical component parts can be used.

In an advantageous manner, two beam splitters of the kind mentioned above which are oriented perpendicular to one another with respect to their respective cylinder axis are arranged adjacent to one another in a positioning instrument. Two beam splitters arranged in this manner can advantageously be used in a self-leveling multiaxis construction laser.

BRIEF DESCRIPTION OF THE DRAWINGS

The invention will be described more fully on the basis of an advantageous embodiment, with reference to the drawings, wherein:

FIG. 1 shows a cross-sectional view of a beam splitter according to the present invention illustrating the beam path;

FIG. 2 shows a perspective view of a beam splitter according to the present invention;

FIG. 4 shows a side view of the beam splitter according to the present invention illustrating its use.

DETAILED DESCRIPTION OF THE PREFERRED EMBODIMENT

Figure 3A:
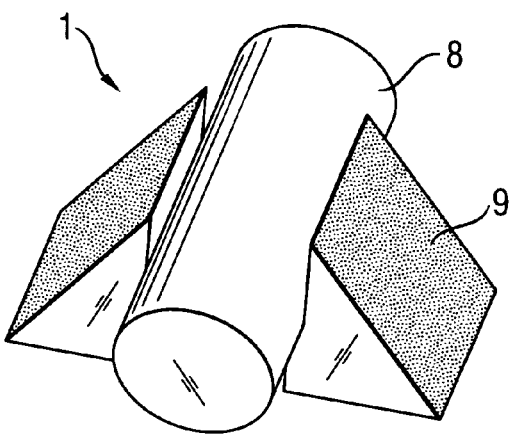
FIGS. 3a, 3b, 3c and 3d show perspective views of other embodiments of a beam splitter according to the present invention.

FIG. 1 shows a cross-sectional view of an optical beam splitter 1, for a light beam 2 that is parallel to a beam axis A. The beam splitter 1 has a transparent central area 3 and two reflecting reflector surfaces 4a, 4b which are inclined relative to the beam axis A by a reflection angle α of exactly 45°. The two reflector surfaces 4a, 4b that are offset by 180° relative to one another around the beam axis A generate two discrete, oppositely directed spot beams 5a, 5b which form a defined reference angle β of 180° relative to one another. The cylindrical segment-shaped central area 3 generates a linear beam 6 which is continuously expanded with the expansion angle γ. The cylindrical axis Z of the cylindrical segment-shaped central area 3 extends perpendicular to the drawing plane and is oriented perpendicular to the beam axis A and to the two spot beams 5a, 5b. The central area 3 has a large cylindrical segment 7a on the beam input side and a small cylindrical segment 7b on the beam output side. The reflector surfaces 4a, 4b are connected to the central area 3 between the cylindrical segments 7a, 7b.

According to FIG. 2, the beam splitter 1 is formed physically in one piece from prismatic injection-molded optics of transparent polystyrene with reflector surfaces 4a, 4b which are silvered on the surface.

Figure 3B:
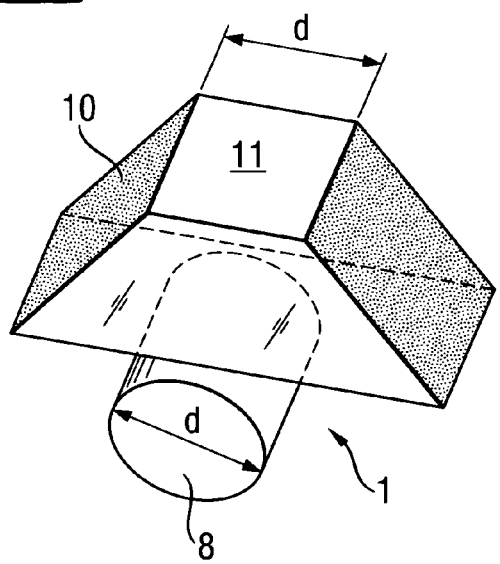
Figure 3C:
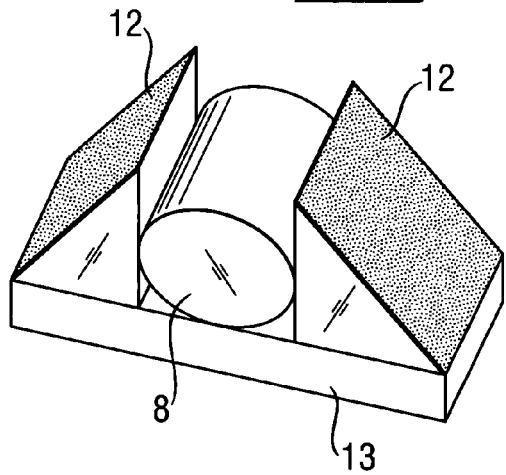
Figure 3D:
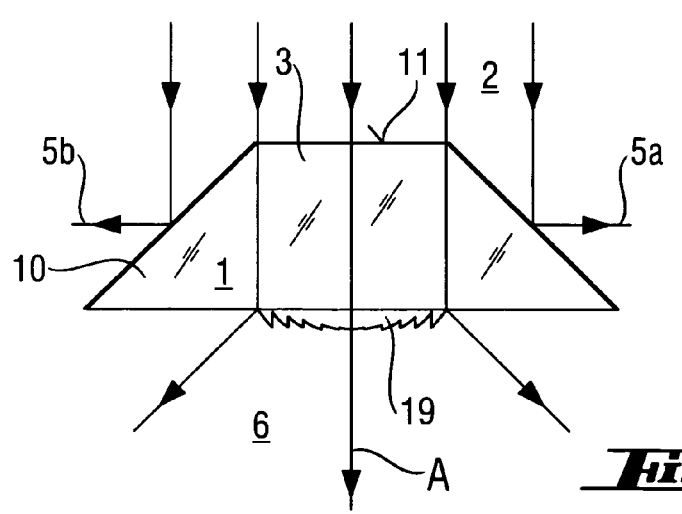

According to FIGS. 3a, 3b and 3c, the beam splitter 1 is formed in a modular form and has a transparent solid cylinder 8 in the form of a glass cylindrical lens, special prismatic reflectors 9 glued to the cylinder 8 on both its sides, as shown in FIG. 3a. According to FIG. 3b, the solid cylinder 8 having diameter d is connected to a side of a flattened glass right-angle prism 10, and which is located opposite from a roof face 11 have a width equal to the diameter of the cylinder 8. According to FIG. 3c, the solid cylinder 8 is arranged between two 45-degree prisms 12 and is mounted together with the prisms 2 on a transparent plane-parallel plate 13. According to FIG. 3d, the central area 3 of a beam splitter 1 which is physically formed in one piece has, on the beam output side, on the side of the flattened right-angle prism 10 that is located opposite from the roof face 11, a beam-expanding diffractive optics 19 in the form of a Fresnel lens which is formed of a cylindrical lens array and which generates a continuously expanded linear beam 6 from the light beam 2 that is parallel to a beam axis A. The width of the difractive optics 19 is equal to the width of the prism 10.

According to FIG. 4, a self-leveling multiaxis construction laser 14 has a pendulum 15 which is aligned with gravitational force G and which has two laser diode optics 16a, 16b, each of which serves as a collimated light beam source. A beam splitter 1 generating a linear beam 6 and two oppositely directed spot beams 5a, 5b is associated in each instance with the laser diode optics 16a, 16b so as to extend axially parallel thereto. The two beam splitters 1, which are oriented so as to be offset relative to one another by 90° with respect to the respective cylinder axis Z, jointly generate four spot beams 5a, 5b that are offset by 90° relative to one another, and a cross beam 17 which is offset by 90° relative to the spot beams 5a, 5b and which is formed from two intersecting linear beams 6. The four spot beams 5a, 5b and the cross beam 17 span a Cartesian coordinate system 18 which is leveled according to the gravitational force G.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. Optical beam splitter for a light beam (2) that is parallel to a beam axis (A), comprising a transparent central area (3); and a plurality of reflecting reflector surfaces (4a, 4b) that are respectively inclined by a constant reflector angle (α) relative to the beam axis (A) for generating each a discrete spot beam (5a, 5b), wherein the central area (3) is convexly shaped in the form of at least a portion of a cylinder, wherein the central area (3) has a cylindrical segment shape with a cross-section forming a portion of a circle, and with a cylinder axis (Z) through the circle that is oriented perpendicular to the beam axis (A) and to the two spot beams (5a, 5b), and wherein the cylindrical segment-shaped central area (3) forms cylindrical surfaces (7a, 7b) of substantially identical curvatures associated with the circle on beam input side and on beam output side.

2. Beam splitter according to claim 1, wherein the cylindrical surface (7a) on the beam input side is associated with a first arc length of the circle which is greater than a second arc length of the circle associated with the cylindrical surface (7b) on the beam output side.

3. Beam splitter according to claim 1, wherein the plurality of reflecting reflector surfaces (4a, 4b) are respectively inclined by a reflector angle of 45 degrees relative to the beam axis (A) for generating two discrete, oppositely directed spot beams (5a, 5b) which form a defined reference angle (β) of 180 degrees relative to each other.

* * * * *